UNITED STATES PATENT OFFICE.

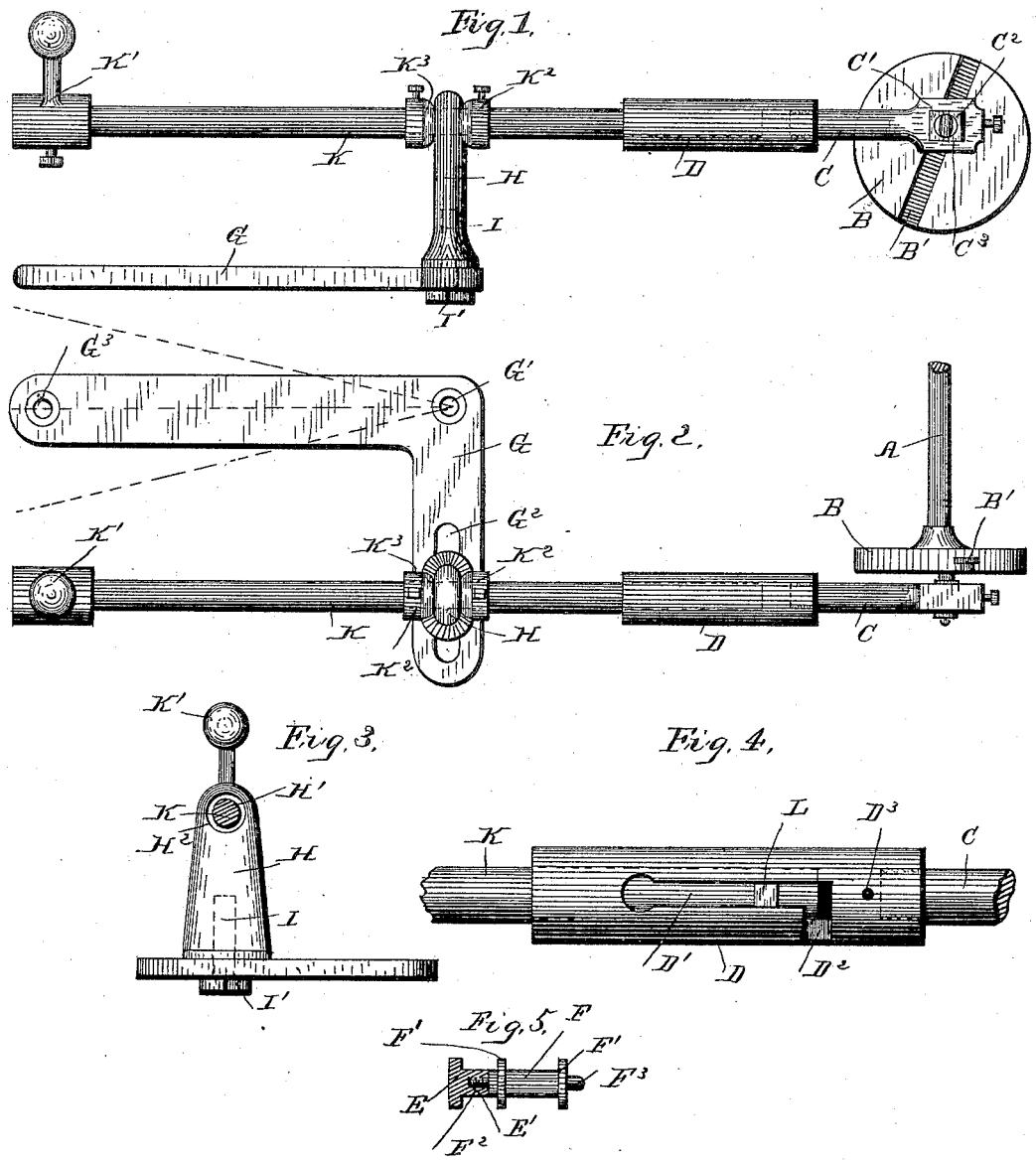

EDRICK GOWDY, OF BRIDGEPORT, CONNECTICUT.

STOPPING AND STARTING MECHANISM.

SPECIFICATION forming part of Letters Patent No. 301,115, dated July 1, 1884.

Application filed May 16, 1884. (No model.)

*To all whom it may concern:*

Be it known that I, EDRICK GOWDY, a citizen of the United States, residing at Bridgeport, in the county of Fairfield and State of Connecticut, have invented certain new and useful Improvements in Stopping and Starting Mechanism; and I do hereby declare the following to be a full, clear, and exact description of the invention, such as will enable others skilled in the art to which it appertains to make and use the same.

My invention is applicable to all classes of machines in which the rotary motion of a shaft or countershaft is converted into reciprocating motion, and has for its object to provide simple, positive, and durable means for stopping and starting the machine, the principal requirements being that the device shall be easy to manipulate and practically impossible to get out of repair.

With these ends in view my invention consists in the construction and combination of parts as hereinafter fully described, and then pointed out in the claims.

In describing the invention I shall refer by letters to the accompanying drawings, forming part of this specification, in which—

Figure 1 is a side elevation, and Fig. 2 a plan view, of the device complete. Fig. 3 is a cross-section of the operating-rod with the collar removed, looking toward the left, one arm of the bell-crank lever, the handle, and the sliding stud being shown in elevation; Fig. 4, a detail on an enlarged scale, showing the connection of the operating-rod with the slotted sleeve, and Fig. 5 is a detail on an enlarged scale of the bearing-pin.

Similar letters indicate like parts in all the figures.

A represents the shaft for supplying power, and B a disk at the end of the shaft, across the center of which is an undercut groove, B'.

C is a connecting-rod, which is rigidly attached, by screw-thread or otherwise, to a sleeve, D. Rod C is connected to the disk by a "suspension" bearing, which I preferably construct as follows:

E is a block corresponding in shape with groove B', and fitted to slide therein. The shank E' of the block is internally screw-threaded.

F is a pin having flanges F', and a reduced screw-threaded portion, F², which engages in the shank of the sliding block.

F³ is a head of any convenient shape for applying a wrench.

C' C² are the parts of an axle-box of ordinary construction. Both parts have semi-cylindrical faces, (not shown,) which bear upon pin F between the flanges. The parts C' C² are fitted in a rectangular slot, C³, in the connecting-rod, and are tightened against the pin by a set-screw.

G is a bell-crank lever, which is pivoted to the bed-plate, or to any other suitable portion of the machine, as at G'. One arm of the lever is provided with a slot, G².

H is a sliding stud, which rests upon this arm of the lever, and is loosely secured thereto by a bolt or pin, I, which passes through slot G², and is driven or screwed into the sliding stud by means of head I'.

H' is an opening through the sliding stud near its upper end, through which the operating-rod K passes.

K' is a handle secured to the operating-rod by a set-screw.

K² represents collars upon the operating-rod, which are secured thereto by set-screws. These collars are beveled upon their inner faces, as at K³, and rest in countersinks H² in the sliding stud. The collars are so adjusted upon the operating-rod as to permit the rod to tilt in any direction, while at the same time lost motion is prevented. The inner end of the operating-rod enters sleeve D, to which it is adapted to be coupled by a bayonet-joint, the sleeve being provided with a longitudinal slot, D', which connects with a shorter transverse slot, D².

L is a stud on the connecting-rod, which is adapted to engage these slots.

D³ is an air-hole to permit the escape of air from within the sleeve when the stud is thrown into slot D².

The operation is as follows: The disk being continually in rotation, it follows that reciprocatory motion will be imparted to the sleeve by means of the connecting-rod. When it is not desired to run the machine, the sleeve is simply allowed to slide upon the operating-rod. In assembling the parts they are so adjusted that at each throw of the sleeve toward the left, stud L passes to the end of the longitudinal slot. The amount of movement imparted to the sleeve is a matter of adjustment, as will presently be explained. When it is desired to start the machine, the operator has merely to take hold of the handle and press toward the right as he stands at the end of the shaft, or toward the left, as shown in Fig. 3. The effect will be to cause stud L to pass into slot $D^2$, thus locking the sleeve and the connecting-rod together, and transmitting the motion of the sleeve to the rod. As stud H is between collars $K^2$, it follows that said stud must move backward and forward with the connecting-rod, thereby imparting vibration to the bell-crank lever. As stated above, bolt I slides freely in slot $G^2$, so that there is practically no loss of power in converting the rotary motion of shaft A into reciprocating motion, as represented by the loose end of the bell-crank lever, at which point, as at $G^3$, connection is made with the machine to be operated. I have not shown any portion of a machine, as my improved mechanism is as well adapted to one class of machine as another, in which rotary motion is converted into reciprocating motion. The throw of the free end of the bell-crank lever is of course dependent upon the throw of the sleeve, which in turn depends upon the distance from the center of disk B, at which sliding block E is adjusted. Whenever it is desired to adjust the throw of the lever, pin F is loosened, and block E moved away from the center if the throw is to be increased, or nearer to the center if it is to be lessened. When the proper adjustment is secured, it is held by screwing up pin F in the shank of the block. Slot D' in the sleeve, in which stud L slides, is made sufficiently long to permit ample throw of the sleeve.

I do not desire to limit myself to the exact construction shown, as it is obvious that the details may be varied within reasonable limits without departing from the spirit of my invention.

I claim—

1. A reciprocating sleeve having a bayonet-slot, in combination with a rod, upon which the sleeve is adapted to slide, and which is provided with a stud engaging the bayonet-slot, and a bell-crank lever connected to said rod, whereby, when the sleeve and rod are locked, motion is imparted to the lever.

2. The bell-crank lever having slot $G^2$ and stud H sliding therein, in combination with the operating-rod, a sleeve connected thereto by a bayonet-joint, and means for imparting reciprocatory motion to the sleeve.

3. A pivoted lever loosely connected to an operating-rod having a stud, as shown, in combination with a sliding sleeve having a bayonet-slot adapted to be engaged by said stud, as described, and for the purpose set forth.

4. The operating-rod having collars, as shown, and stud H, carried thereby, in combination with the sliding sleeve connected to said rod by a bayonet-joint.

5. Disk B, having groove B', block E, engaging said groove, and pin F, which carries the connecting-rod, in combination with a sleeve moving with the connecting-rod, and having a bayonet-slot, and an operating-rod having a stud engaging said bayonet-slot, substantially as described.

6. The shaft, disk, connecting-rod, and sleeve having bayonet-slot, in combination with an operating-rod engaging in said sleeve, and operating mechanism, to which motion is imparted by said rod.

7. The sliding sleeve having bayonet-slot and an operating-rod having a stud engaging in said slot, and a handle for operating the same, in combination with a sliding stud having an opening, through which the rod passes, collars holding said stud, and an operating-lever carried thereby.

8. The sliding sleeve having slots D' $D^2$, and the operating-rod having studs L, engaging in said slots, in combination with stud H, carried by said rod and held by collars, which permit free movement in all directions, and lever G, having a slot in which stud H is pivoted, whereby, when stud L is in slot D', the sleeve slides upon the operating-rod, but when said stud is in slot $D^2$ movement is imparted to lever G.

In testimony whereof I affix my signature in presence of two witnesses.

EDRICK GOWDY.

Witnesses:
ANDREW J. EWEN,
EDWIN B. GAGER.